US008856467B2

(12) United States Patent
Mahar et al.

(10) Patent No.: US 8,856,467 B2
(45) Date of Patent: Oct. 7, 2014

(54) MANAGEMENT OF METADATA IN A STORAGE SUBSYSTEM

(75) Inventors: Aaron S Mahar, Tucson, AZ (US); Angelique R Budaya, Tucson, AZ (US); James A Springer, Tucson, AZ (US)

(73) Assignee: International business Machines Corporation, Armonk, NY (US)

( * ) Notice: Subject to any disclaimer, the term of this patent is extended or adjusted under 35 U.S.C. 154(b) by 3154 days.

(21) Appl. No.: 10/993,022

(22) Filed: Nov. 18, 2004

(65) Prior Publication Data
US 2006/0106971 A1 May 18, 2006

(51) Int. Cl.
G06F 12/00 (2006.01)
G06F 3/06 (2006.01)
G06F 11/14 (2006.01)

(52) U.S. Cl.
CPC .............. G06F 3/064 (2013.01); *G06F 3/065* (2013.01); *G06F 3/0622* (2013.01); G06F 3/0605 (2013.01); G06F 3/061 (2013.01); *G06F 2211/104* (2013.01); G06F 3/0683 (2013.01); *G06F 11/1474* (2013.01); *G06F 2212/466* (2013.01)
USPC .......................................... 711/156

(58) Field of Classification Search
CPC ................ G06F 3/061; G06F 17/3012; G06F 2211/104; G06F 2212/466; G06F 2212/7207
USPC ......... 711/147–153, 156, 141, 135, 118, 103, 711/154, 170
See application file for complete search history.

(56) References Cited

U.S. PATENT DOCUMENTS

| | | | |
|---|---|---|---|
| 4,989,136 A | 1/1991 | Gurd et al. | |
| 5,410,667 A | 4/1995 | Belsan et al. | |
| 5,778,168 A | 7/1998 | Fuller | |
| 5,870,753 A | 2/1999 | Chang et al. | |
| 5,897,661 A | 4/1999 | Baranovsky | |
| 6,052,759 A | 4/2000 | Stallmo et al. | |
| 6,292,869 B1 | 9/2001 | Gerchman et al. | |
| 6,298,425 B1 | 10/2001 | Whitaker et al. | |
| 6,308,182 B1 | 10/2001 | Nishigaya et al. | |
| 6,339,793 B1 | 1/2002 | Bostian et al. | |
| 6,438,661 B1 | 8/2002 | Beardsley et al. | |

(Continued)

FOREIGN PATENT DOCUMENTS

| | | | | |
|---|---|---|---|---|
| EP | 1193899 | 4/2002 | | |
| WO | WO 01/90949 | * 11/2001 | ............. | G06F 17/30 |
| WO | WO 03/028293 | 4/2003 | | |

*Primary Examiner* — April Y Blair
*Assistant Examiner* — Nicholas Simonetti
(74) *Attorney, Agent, or Firm* — Dan Shifrin

(57) ABSTRACT

Methods, systems, computer program products and methods for deploying computing infrastructure for managing metadata in a storage subsystem are provided. A call is received from a client to update a portion of a metadata track. Data is also received from the client identifying at least one field of the metadata track to be updated, associated update values for the at least one field to be updated and an update type for the at least one field. A data structure field of a client interface is then populated with the identity of the at least one field and the associated update values and an opcode field of the client interface is populated with the update type. A task control block (TCB) is then allocated to the client call and, at the direction of the TCB, various operations are performed without further activity by the client. The metadata track may also be validated before being updated to ensure that the client has access only to valid updates.

48 Claims, 3 Drawing Sheets

(56) References Cited

U.S. PATENT DOCUMENTS

| | | |
|---|---|---|
| 6,502,174 B1 * | 12/2002 | Beardsley et al. ............ 711/170 |
| 6,697,846 B1 | 2/2004 | Soltis |
| 6,714,930 B1 | 3/2004 | Garrison et al. |
| 6,725,392 B1 | 4/2004 | Frey et al. |
| 6,751,705 B1 | 6/2004 | Solomon et al. |
| 6,769,124 B1 | 7/2004 | Schoening et al. |
| 2002/0112125 A1 | 8/2002 | Copeland et al. |
| 2003/0088750 A1 | 5/2003 | Wu et al. |
| 2003/0093770 A1 | 5/2003 | Fernandez |
| 2003/0177130 A1 | 9/2003 | Todd |

* cited by examiner

MANAGEMENT OF METADATA IN A STORAGE SUBSYSTEM

RELATED APPLICATION DATA

The present application is related to commonly assigned and copending U.S. application Ser. No. 10/993,092, entitled SELECTIVE CLEARING OF PERSISTENT METADATA IN A STORAGE SUBSYSTEM; Ser. No. 10/993,048, entitled CLEARING METADATA TRACKS IN A STORAGE SYSTEM; Ser. No. 10/993,087, entitled MANAGING ATOMIC UPDATES ON METADATA TRACKS IN A STORAGE SYSTEM, filed on the filing date hereof, which applications are incorporated herein by reference in their entirety.

TECHNICAL FIELD

The present invention relates generally to enterprise storage subsystems and, in particular, to efficiently and securely managing metadata.

BACKGROUND ART

Enterprise computing systems typically include one or more host systems for processing customer data and running application programs, direct access storage devices (DASDs) for storing the data, and one or more storage controllers for directing the storage and retrieval of data between the host(s) and the DASDs. In addition to the customer data, the storage controller typically maintains metadata which provides information about tracks or blocks of data in the DASD or in cache storage in the storage controller. The storage controller processes the metadata during certain operations on the customer data represented by the metadata to improve the speed and efficiency with which requested operations are performed. During DASD initialization, metadata is staged from disk to a cache storage (a volatile type of storage). A power failure or certain other types of errors may cause the contents of the cache to be lost.

Certain storage controllers, such as the IBM™ Enterprise Storage Server™ (ESS), may be configured with copy services functionality, including (but not limited to) flash copy, peer-to-peer remote copy, extended remote copy, and concurrent copy which assist in backing up data and recovering from disasters. During a copy service (CS) operation, multi-field CS metadata is generated and maintained by the storage controller. The CS metadata includes information about the state of a copy services operation at any point in time, such as internal settings, source and destination addresses, and other data about the state of data being copied. Consequently, if a controller loses power or encounters some other interrupting event, the controller may be restarted, the metadata read, the CS operation restored to the point of interruption and then resumed and completed.

In an earlier version of the IBM ESS, the CS metadata was maintained in a 26 KB in-memory structure that was updated directly by the clients. During an update, the entire structure was written to disk, even if only a few fields were updated, and no record was kept of which fields of the metadata were changed. In a subsequent version, the 26 KB structure of CS control data was mapped to seven 8 KB global metadata tracks. During an update, only a metadata track containing an updated field was written to the disk. While an improvement over the original process, there was still no record of which fields were updated. When the 8 KB track is written to disk, the track is divided into three parts, and each part is a single write operation. For security, each full 8 KB track is stored in three separate locations. Therefore, each update to a single metadata track requires nine write operations.

Journaling has been implemented to allow storing updates in non-volatile storage (NVS), improving update performance and maintaining the metadata in the event of a power loss or other significant event. Each metadata track has a corresponding page in NVS which includes a chain of blocks containing a sequence of journal entries identifying an operation being performed and the data in cache being modified. During a recovery operation, the metadata may be staged from disk to cache and the changes previously recorded in the journal entries applied, thereby restoring the metadata to have the most current version of data. Nonetheless, the fields which have been modified may not be specifically identifiable. Additionally, as is known NVS is expensive relative to other types of storage and, therefore, it is desirable to limit its use as much as possible.

In such prior systems, when a client requested access to a metadata track, such as to update one or more fields in the track, numerous controller resources are required to provide such functions as journal access, track access, task control block (TCB) allocation and track lock (to ensure that only one process has access to target data at a time). Such resource use ties up the controller processor. Furthermore, heretofore the client has had full access to the metadata tracks, subjecting them to possible overwrites and other risks to integrity. A metadata track may also become invalid for any of a number of reasons, such as a memory overwrite, a failover/power loss, or a bad longitudinal redundancy check (LRC). For example, during error handling recoveries, the LRC is checked and, if not correct, the track is marked as invalid. It will be appreciated that an attempt to access or update an invalid metadata should not be made.

Consequently, it remains desirable for more efficient and thorough management of metadata, such as copy services metadata.

SUMMARY OF THE INVENTION

The present invention provides methods for managing metadata in a storage subsystem. A call is received from a client to update a portion of a metadata track. Through the use of an opcode, at least one field of the metadata track to be updated, along with an update type for the at least one field. A data structure field of a client interface is then populated with the identity of the at least one field and associated update values and an opcode field of the client interface is populated with the update type.

In one embodiment, a task control block (TCB) is then allocated to the client call. At the direction of the TCB, a lock is acquired whereby other clients are prevented from accessing the metadata track containing the at least one field to be updated, the metadata track is staged to cache, the at least one field is copied to the TCB, the update type is applied to map the update values of the at least one field to the metadata track and the metadata is copied into the TCB. Finally, control of the client interface is returned to the client whereby the metadata track with the fields to be updated is subsequently destaged. In such a manner, only a minimum amount of information is collected about changes to a potentially large number of structures. Information about which fields have been modified is preserved, allowing journaling and selective destaging. Moreover, a single call from the client initiates several functions, thereby increasing the efficiency and usability of metadata access.

In another embodiment, the metadata track is validated after reading the metadata track containing the at least one field to be updated after which the update type is applied to map the update values of the at least one field to the metadata track and control of the client interface is returned to the client whereby the metadata track with the fields to be updated is subsequently destaged. Thus, the present invention provides on-demand track validation to ensure that clients requesting access to metadata have valid metadata.

The present invention also provides systems, computer program products and methods for deploying computing infrastructure for managing metadata in a storage subsystem.

DETAILED DESCRIPTION OF THE PREFERRED EMBODIMENT

Figure 1:
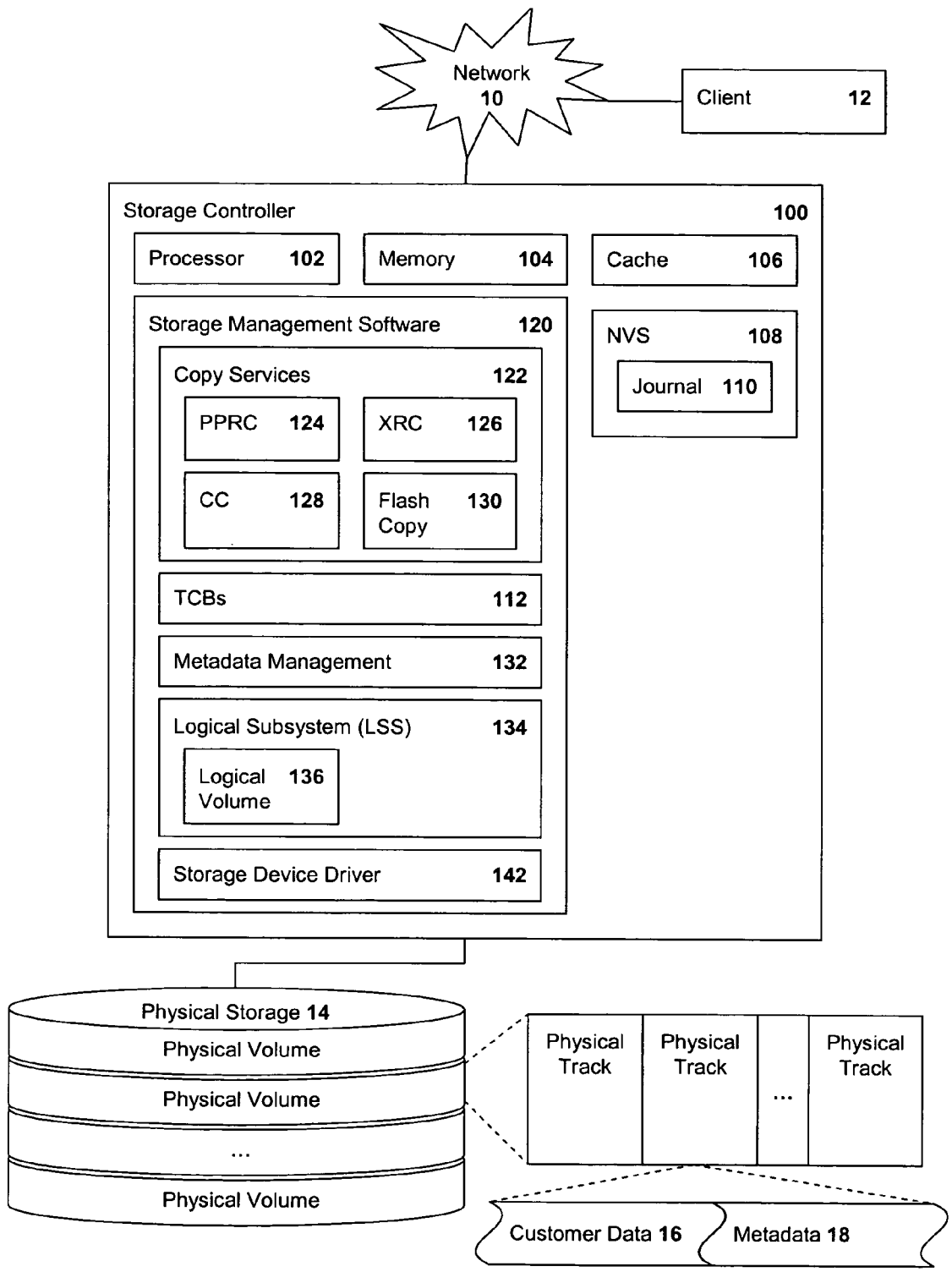
FIG. 1 is a block diagram of a metadata management system of the present invention.

FIG. 1 is a block diagram of a storage controller 100 implementing metadata management of the present invention. The controller 100 is attached, through a network 10, to at least one client system 12. The controller 100 is also attached to at least one storage device 14, such as direct access storage devices (DASDs).

The controller 100 includes a processor 102, general memory 104 for storing computer-readable code having instructions executable by the processor 102, a cache storage 106 and non-volatile storage (NVS) 108. The controller 100 further includes a journaling area 110 and storage management software 120, both of which may actually be stored in the memory 104. The controller 100 includes a processor 102, general memory 104 for storing computer-readable code having instructions executable by the processor 102, a cache storage 106 and non-volatile storage (NVS) 108. The NVS 108 includes a journaling area 110; the controller 100 further includes storage management software 120 which may actually be stored in the memory 104. The storage management software 120 may include copy services (CS) code 122 and metadata management code 132. Copy services code 122 may include, but are not limited to, a peer-to-peer remote copy (PPRC) function 124, an extended remote copy (XRC) function 126, a concurrent copy (CC) 128 and/or a flash copy or point-in-time copy function 130. Such services assist in backing up data, copying data and recovering from disasters.

The storage management software 120 further includes task control blocks 112, one or more logical subsystems (LSS) 134, configured into one or more logical volumes 136, and a storage device driver 142. In some storage controllers, both the cache 106 and the NVS 108 may be microcode constructs within the memory 104, configured by, and considered to be a part of, the device driver 142.

The storage device 14 may be configured into tracks having both customer data 16 and metadata 18. As previously noted, metadata may be either global, stored separate from the corresponding customer data (as illustrated in FIG. 1), or segmented, stored with the corresponding customer data.

Figure 2:
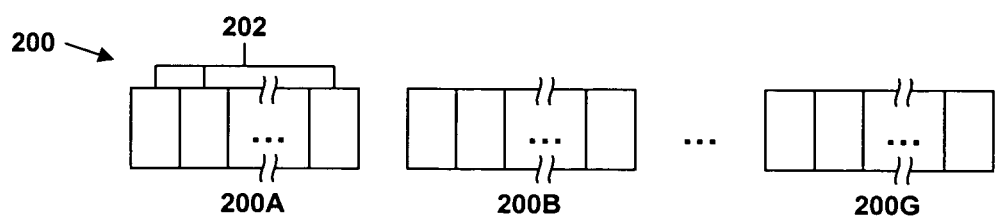
FIG. 2 is a representation of a series of metadata tracks with which the present invention may be implemented.
Figure 3:
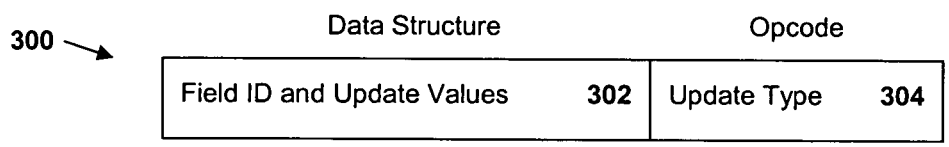
FIG. 3 is a representation of a client interface of the present invention.
Figure 4:
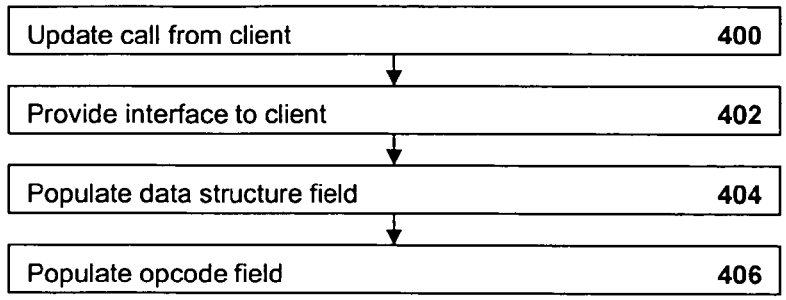
FIGS. 4, 5 and 6 are flowcharts of methods of the present invention.

Referring also to the flowchart of FIG. 4, in operation a call is received (step 400) by the controller 100 from the client 12 to access and update a portion of a metadata track stored in the storage device 14. In certain the IBM products, metadata is stored as seven 8 KB tracks 200A-200G (FIG. 2). It will be appreciated, however, that the scope of the present invention is not limited by the number and size of the metadata tracks described herein. Each track 200 includes a number of fields 202. An interface 300 (FIG. 3) is provided to the client 12 (step 402) and used to provide information to the controller 100. The interface 300 includes a data structure field 302 and an opcode field 304. The data structure field 302 will be populated with an identification of the field(s) to be updated and associated update values (step 404). The opcode field 304 will be populated with the type of update being requested (step 406). Update types may include, but are not limited to, 'establish PPRC path', 'terminate PPRC path', establish PPRC pair', 'terminate PPRC pair', 'establish XRC session', and 'terminate XRC session'.

Figure 5:
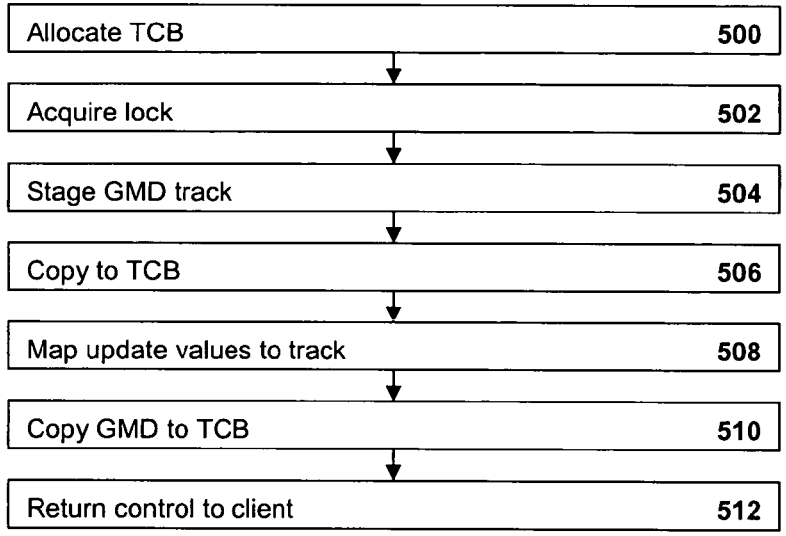

In one embodiment of the present invention (FIG. 5), a task control block (TCB) 112 is allocated next to the client call (step 500). In order to prevent other processes from attempting to access the metadata track, a lock is acquired (step 502). At the direction of the TCB 112, all of the following operations may be performed without further involvement of the client: First, the metadata track containing the field(s) to be updated is staged from the storage device 14 (step 504) to the cache 106. The field(s) to be updated are copied to the TCB 112 (step 506). Next, based on the update type in the opcode field 304 of the interface 300, the update values contained in the data structure field 302 are mapped to the metadata track (step 508). The metadata is then copied into the TCB 112 for use by the calling client (step 510). Control of the interface 300 is returned to the client 12 (step 512). Thus, only a single call or request by the client 12 is necessary to initiate the allocation of required resources through a single TCB. Moreover, the client 12 is provided with only those fields which are being updated, thus protecting the metadata from inadvertent overwrites and allowing the selective destaging of only the updated fields. And, the update structure information 302 and the opcode 304 will be sufficient to apply an update in the event of a journal recovery.

Figure 6:
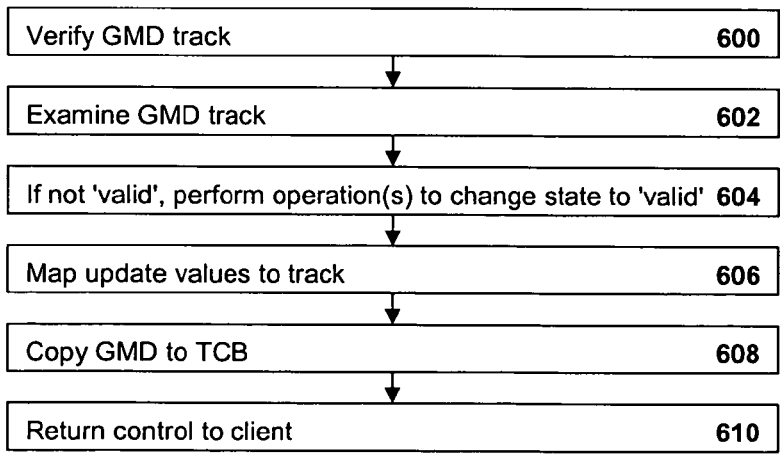

In another embodiment (FIG. 6), after the fields 302, 304 of the interface 300 have been populated (step 406), the metadata track containing the field(s) to be updated is verified (step 600). First, the state of the track is examined (step 602). Possible states may include, but are not limited to, valid, 'invalid', 'CST' (clear all tracks), 'CST pending' and 'update in progress'. If the state is determined to be other than 'valid', steps are taken to change its state to 'valid' (step 604). In combination with the embodiment described in the preceding paragraphs, validation of the track may be performed at the direction of a TCB. By way of example but not limitation, if the state indicates that an update was interrupted, the update may be rolled back or forward as described in the above-referenced U.S. application Ser. No. 10/993,087. If the state is 'invalid', a journal recovery is performed to apply all successful updates to the track. If the state is 'CST pending', the CST operation will be completed. After the track has been validated, the update values contained in the data structure field 302 are mapped to the metadata track (step 606) based on the update type in the opcode field 304 of the interface 300. The metadata is then copied into the TCB 112 for use by the calling client (step 608). Control of the interface 300 is returned to the client 12 (step 610). Thus, only valid updates are placed in the cache 106 after which the metadata track with the modified fields is staged to the storage device 14.

In a still further embodiment, the fields of a metadata track are grouped in such a manner that those fields which are likely to be updated during a particular update type are placed together in a first group while those fields which are likely to be updated during a different update type are placed together in a second group. Thus, the client 12 is presented with fields to be populated based upon the update type returned by the client 12 to the controller 100 while the other fields remain out of the reach of the client.

It is important to note that while the present invention has been described in the context of a fully functioning data processing system, those of ordinary skill in the art will appreciated that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for managing metadata or a method for deploying computing infrastructure comprising integrating computer readable code into a computing system for managing metadata.

What is claimed is:

1. A method for managing metadata in a storage subsystem, comprising:
   receiving a call from a client to update a portion of a metadata track;
   receiving from the client data identifying at least one field of the metadata track to be updated, associated update values for the at least one field to be updated and an update type for the at least one field;
   populating a data structure field of a client interface with the identity of the at least one field and the associated update values;
   populating an opcode field of the client interface with the update type;
   allocating a task control block (TCB) to the client call;
   acquiring a lock whereby other clients are prevented from accessing the metadata track;
   at the direction of the TCB:
      staging to a cache the metadata track containing the at least one field to be updated;
      copying the at least one field to the TCB;
      applying the update type to map the update values of the at least one field to the metadata track; and
      copying the metadata into the TCB; and
   returning control of the client interface to the client whereby the metadata track with the fields to be updated is subsequently destaged.

2. The method of claim 1, further comprising reading and validating the metadata track at the direction of the TCB after staging the metadata track containing the at least one field to be updated.

3. The method of claim 2, wherein validating the metadata track comprises:
   determining if the metadata track is in a valid state; and
   if the metadata track is not in a valid state, performing a journal recovery of the metadata track.

4. The method of claim 2, wherein validating the metadata track comprises:
   determining if the metadata track is in a valid state; and
   if the metadata track is not in a valid state, performing a clear status track (CST) operation on the metadata track.

5. The method of claim 1, further comprising:
   creating a plurality of subsets of metadata fields which are likely to be updated during a corresponding plurality of predetermined access operations by a client, each access operation being identified by an update type; and
   in response to the client call, sending to the client the subset of metadata fields corresponding to the update type provided by the client;
   whereby the client is granted access only to those fields of the metadata track which are likely to be updated during the operation identified by the update type.

6. The method of claim 1, wherein the metadata comprises copy services metadata.

7. A method for managing metadata in a storage subsystem, comprising:
   receiving a call from a client to update a portion of a metadata track;
   receiving from the client data identifying at least one field of the metadata track to be updated, associated update values for the at least one field to be updated and an update type for the at least one field;
   populating a data structure field of a client interface with the identity of the at least one field and the associated update values;
   populating an opcode field of the client interface with the update type;
   reading the metadata track containing the at least one field to be updated;
   validating the metadata track after reading the metadata track containing the at least one field to be updated;
   applying the update type to map the update values of the at least one field to the metadata track; and
   returning control of the client interface to the client whereby the metadata track with the fields to be updated is subsequently destaged.

8. The method of claim 7, wherein validating the metadata track comprises:
   determining if the metadata track is in a valid state; and
   if the metadata track is not in a valid state, performing a journal recovery of the metadata track.

9. The method of claim 7, wherein validating the metadata track comprises:
   determining if the metadata track is in a valid state; and
   if the metadata track is not in a valid state, performing a clear status track (CST) operation on the metadata track.

10. The method of claim 7, further comprising:
    creating a plurality of subsets of metadata fields which are likely to be updated during a corresponding plurality of predetermined access operations by a client, each access operation being identified by an update type; and
    in response to the client call, sending to the client the subset of metadata fields corresponding to the update type provided by the client;
    whereby the client is granted access only to those fields of the metadata track which are likely to be updated during the operation identified by the update type.

11. The method of claim 7, further comprising acquiring a lock whereby other clients are prevented from accessing the metadata track.

12. The method of claim 7, wherein the metadata comprises copy services metadata.

13. A system for managing metadata in a storage subsystem, comprising:
a processor; and
a memory for storing instructions executable on the processor, the instructions comprising:
receiving a call from a client to update a portion of a metadata track;
receiving from the client data identifying at least one field of the metadata track to be updated, associated update values for the at least one field to be updated and an update type for the at least one field;
a client interface, comprising:
a data structure field for holding the identity of the at least one field and the associated update values; and
an opcode field for holding the update type;
a task control block (TCB) allocated to the client call and operable to direct, after acquisition of a lock whereby other clients are prevented from accessing the metadata track:
staging to a cache of the metadata track containing the at least one field to be updated;
copying of the at least one field to the TCB;
application of the update type to map the update values of the at least one field to the metadata track; and
copying of the metadata into the TCB; and
returning control of the client interface to the client whereby the metadata track with the fields to be updated is subsequently destaged.

14. The system of claim 13, wherein the TCB is further operable to direct a reading and validation of the metadata track after the metadata track has been staged.

15. The system of claim 14, wherein, during the validation of the metadata track, the TCB is further operable to direct:
determining whether the metadata track is in a valid state; and
if the metadata track is not in a valid state, journal recovery of the metadata track.

16. The system of claim 14, wherein, during the validation of the validation of the metadata track, the TCB is further operable to direct:
determining whether the metadata track is in a valid state; and
if the metadata track is not in a valid state, clear status track (CST) operation on the metadata track.

17. The system of claim 13, the instructions further comprising:
creating a plurality of subsets of metadata fields which are likely to be updated during a corresponding plurality of predetermined access operations by a client, each access operation being identified by an update type; and
sending to the client, in response to the client call, the subset of metadata fields corresponding to the update type provided by the client;
whereby the client is granted access only to those fields of the metadata track which are likely to be updated during the operation identified by the update type.

18. The system of claim 13, wherein the metadata comprises copy services metadata.

19. A system for managing metadata in a storage subsystem, comprising:
a processor; and
a memory for storing instructions executable on the processor, the instructions comprising:
receiving a call from a client to update a portion of a metadata track;
receiving from the client data identifying at least one field of the metadata track to be updated, associated update values for the at least one field to be updated and an update type for the at least one field;
a client interface, comprising:
a data structure field for holding the identity of the at least one field and the associated update values; and
an opcode field for holding the update type;
a task control block (TCB) allocated to the client call and operable to direct, after acquisition of a lock whereby other clients are prevented from accessing the metadata track:
staging to a cache the metadata track containing the at least one field to be updated;
copying the at least one field to the TCB;
reading and validating the metadata track after the metadata track has been staged;
returning control of the client interface to the client whereby the metadata track with the fields to be updated is subsequently destaged.

20. The system of claim 19, wherein, during the validation of the metadata track, the TCB is further operable to direct:
determining whether the metadata track is in a valid state; and
if the metadata track is not in a valid state, journal recovery of the metadata track.

21. The system of claim 19, wherein, during the validation of the validation of the metadata track, the TCB is further operable to direct:
determining whether the metadata track is in a valid state; and
if the metadata track is not in a valid state, clear status track (CST) operation on the metadata track.

22. The system of claim 19, the instructions further comprising:
creating a plurality of subsets of metadata fields which are likely to be updated during a corresponding plurality of predetermined access operations by a client, each access operation being identified by an update type; and
sending to the client, in response to the client call, the subset of metadata fields corresponding to the update type provided by the client;
whereby the client is granted access only to those fields of the metadata track which are likely to be updated during the operation identified by the update type.

23. The system of claim 19, wherein the TCB is further operable to direct an acquisition of a lock whereby other clients are prevented from accessing the metadata track after the metadata track has been read.

24. The system of claim 19, wherein the metadata comprises copy services metadata.

25. A computer program product of a non-transitory computer readable medium usable with a programmable computer, the computer program product having computer-readable code embodied therein for managing metadata in a storage subsystem, the computer-readable code comprising instructions for:
receiving a call from a client to update a portion of a metadata track;

receiving from the client data identifying at least one field of the metadata track to be updated, associated update values for the at least one field to be updated and an update type for the at least one field;

populating a data structure field of a client interface with the identity of the at least one field and the associated update values;

populating an opcode field of the client interface with the update type;

acquiring a lock whereby other clients are prevented from accessing the metadata track;

allocating a task control block (TCB) to the client call;

at the direction of the TCB:
staging to a cache the metadata track containing the at least one field to be updated;
copying, the at least one field to the TCB;
applying the update type to map the update values of the at least one field to the metadata track; and
copying the metadata into the TCB; and returning control of the client interface to the client whereby the metadata track with the fields to be updated is subsequently destaged.

26. The computer program product of claim 25, wherein the instructions further comprise reading and validating the metadata track at the direction of the TCB after staging the metadata track containing the at least one field to be updated.

27. The computer program product of claim 26, wherein the instructions for validating the metadata track comprise instructions for:
determining if the metadata track is in a valid state; and
if the metadata track is not in a valid state, performing a journal recovery of the metadata track.

28. The computer program product of claim 26, wherein the instructions for validating the metadata track comprise instructions for:
determining if the metadata track is in a valid state; and
if the metadata track is not in a valid state, performing a clear status track (CST) operation on the metadata track.

29. The computer program product of claim 25, wherein the instructions further comprise:
creating a plurality of subsets of metadata fields which are likely to be updated during a corresponding plurality of predetermined access operations by a client, each access operation being identified by an update type; and
in response to the client call, sending to the client the subset of metadata fields corresponding to the update type provided by the client;
whereby the client is granted access only to those fields of the metadata track which are likely to be updated during the operation identified by the update type.

30. The computer program product of claim 25, wherein the metadata comprises copy services metadata.

31. A computer program product of a non-transitory computer readable medium usable with a programmable computer, the computer program product having computer-readable code embodied therein for managing metadata in a storage subsystem, the computer-readable code comprising instructions for:
receiving a call from a client to update a portion of a metadata track;
receiving from the client data identifying at least one field of the metadata track to be updated, associated update values for the at least one field to be updated and an update type for the at least one field;
populating a data structure field of a client interface with the identity of the at least one field and the associated update values;
populating an opcode field of the client interface with the update type;
reading the metadata track containing the at least one field to be updated;
validating the metadata track after reading the metadata track containing the at least one field to be updated;
applying the update type to map the update values of the at least one field to the metadata track; and
returning control of the client interface to the client whereby the metadata track with the fields to be updated is subsequently destaged.

32. The computer program product of claim 31, wherein the instructions for validating the metadata track comprise instructions for:
determining if the metadata track is in a valid state; and
if the metadata track is not in a valid state, performing a journal recovery of the metadata track.

33. The computer program product of claim 31, wherein the instructions for validating the metadata track comprise instructions for:
determining if the metadata track is in a valid state; and
if the metadata track is not in a valid state, performing a clear status track (CST) operation on the metadata track.

34. The computer program product of claim 31, further comprising instructions for:
creating a plurality of subsets of metadata fields which are likely to be updated during a corresponding plurality of predetermined access operations by a client, each access operation being identified by an update type; and
in response to the client call, sending to the client the subset of metadata fields corresponding to the update type provided by the client;
whereby the client is granted access only to those fields of the metadata track which are likely to be updated during the operation identified by the update type.

35. The computer program product of claim 31, further comprising instructions for acquiring a lock whereby other clients are prevented from accessing the metadata track.

36. The computer program product of claim 31, wherein the metadata comprises copy services metadata.

37. A method for deploying computing infrastructure, comprising integrating computer readable code into a computing system, wherein the code, in combination with the computing system, is capable of performing the following:
receiving a call from a client to update a portion of a metadata track;
receiving from the client data identifying at least one field of the metadata track to be updated, associated update values for the at least one field to be updated and an update type for the at least one field;
populating a data structure field of a client interface with the identity of the at least one field and the associated update values;
populating an opcode field of the client interface with the update type;
allocating a task control block (TCB) to the client call;
acquiring a lock whereby other clients are prevented from accessing the metadata track;
at the direction of the TCB:
staging to a cache the metadata track containing the at least one field to be updated;
copying the at least one field to the TCB;
applying the update type to map the update values of the at least one field to the metadata track; and
copying the metadata into the TCB; and returning control of the client interface to the client whereby the metadata track with the fields to be updated is subsequently destaged.

38. The method of claim 37, wherein the code is further capable of reading and validating the metadata track at the direction of the TCB after staging the metadata track containing the at least one field to be updated.

39. The method of claim 38, wherein the code for validating the metadata track comprises code capable of performing the following:
   determining if the metadata track is in a valid state; and
   if the metadata track is not in a valid state, performing a journal recovery of the metadata track.

40. The method of claim 38, wherein the code for validating the metadata track comprises code capable of performing the following:
   determining if the metadata track is in a valid state; and
   if the metadata track is not in a valid state, performing a clear status track (CST) operation on the metadata track.

41. The method of claim 37, wherein the code is further capable of:
   creating a plurality of subsets of metadata fields which are likely to be updated during a corresponding plurality of predetermined access operations by a client, each access operation being identified by an update type; and
   in response to the client call, sending to the client the subset of metadata fields corresponding to the update type provided by the client;
   whereby the client is granted access only to those fields of the metadata track which are likely to be updated during the operation identified by the update type.

42. The method of claim 37, wherein the metadata comprises copy services metadata.

43. A method for deploying computing infrastructure, comprising integrating computer readable code into a computing system, wherein the code, in combination with the computing system, is capable of performing the following:
   receiving a call from a client to update a portion of a metadata track;
   receiving from the client data identifying at least one field of the metadata track to be updated, associated update values for the at least one field to be updated and an update type for the at least one field;
   populating a data structure field of a client interface with the identity of the at least one field and the associated update values;
   populating an opcode field of the client interface with the update type; reading the metadata track containing the at least one field to be updated;
   validating the metadata track after reading the metadata track containing the at least one field to be updated;
   applying the update type to map the update values of the at least one field to the metadata track; and
   returning control of the client interface to the client whereby the metadata track with the fields to be updated is subsequently destaged.

44. The method of claim 43, wherein the code for validating the metadata track is capable of performing the following:
   determining if the metadata track is in a valid state; and
   if the metadata track is not in a valid state, performing a journal recovery of the metadata track.

45. The method of claim 43, wherein the code for validating the metadata track is capable of performing the following:
   determining if the metadata track is in a valid state; and
   if the metadata track is not in a valid state, performing a clear status track (CST) operation on the metadata track.

46. The method of claim 43, wherein the code is further capable of:
   creating a plurality of subsets of metadata fields which are likely to be updated during a corresponding plurality of predetermined access operations by a client, each access operation being identified by an update type; and
   in response to the client call, sending to the client the subset of metadata fields corresponding to the update type provided by the client;
   whereby the client is granted access only to those fields of the metadata track which are likely to be updated during the operation identified by the update type.

47. The method of claim 43, wherein the code is further capable of acquiring a lock whereby other clients are prevented from accessing the metadata track.

48. The method of claim 43, wherein the metadata comprises copy services metadata.

* * * * *